(12) United States Patent
Zhu

(10) Patent No.: US 11,550,646 B2
(45) Date of Patent: Jan. 10, 2023

(54) METHOD OF VERIFYING ACCESS OF MULTI-CORE INTERCONNECT TO LEVEL-2 CACHE

(71) Applicant: C-SKY Microsystems Co., Ltd., Zhejiang (CN)

(72) Inventor: Taotao Zhu, Hangzhou (CN)

(73) Assignee: C-SKY Microsystems Co., Ltd., Zhejiang (CN)

( * ) Notice: Subject to any disclaimer, the term of this patent is extended or adjusted under 35 U.S.C. 154(b) by 0 days.

(21) Appl. No.: 16/488,502

(22) PCT Filed: May 31, 2019

(86) PCT No.: PCT/CN2019/089556
§ 371 (c)(1),
(2) Date: Aug. 23, 2019

(87) PCT Pub. No.: WO2019/228506
PCT Pub. Date: Dec. 5, 2019

(65) Prior Publication Data
US 2021/0357327 A1    Nov. 18, 2021

(30) Foreign Application Priority Data

Jun. 1, 2018   (CN) .......................... 201810558363.5

(51) Int. Cl.
*G06F 11/00* (2006.01)
*G06F 11/07* (2006.01)
(Continued)

(52) U.S. Cl.
CPC ........ *G06F 11/0724* (2013.01); *G06F 11/073* (2013.01); *G06F 11/0751* (2013.01);
(Continued)

(58) Field of Classification Search
None
See application file for complete search history.

(56) References Cited

U.S. PATENT DOCUMENTS 5,793,941 A    8/1998  Pencis et al.
9,507,717 B1 * 11/2016 Busaba ................. G06F 3/0637
(Continued)

FOREIGN PATENT DOCUMENTS

CN    101008921 A    8/2007
CN    101354682 A    1/2009
(Continued)

OTHER PUBLICATIONS

Google Scholar/Patents—text refined (Year: 2021).*
(Continued)

*Primary Examiner* — Christopher S McCarthy
(74) *Attorney, Agent, or Firm* — Finnegan, Henderson, Farabow, Garrett & Dunner, LLP

(57) ABSTRACT

The present disclosure provides a method and a system of verifying access by a multi-core interconnect to an L2 cache in order to solve problems of delays and difficulties in locating errors and generating check expectation results. A consistency transmission monitoring circuitry detects, in real time, interactions among a multi-core interconnects system, all single-core processors, an L2 cache and a primary memory, and sends collected transmission information to an L2 cache expectation generator and a check circuitry. The L2 cache expectation generator obtains information from a global memory precise control circuitry according to a multi-core consistency protocol and generates an expected result. The check circuitry is responsible for comparing the expected result with an actual result, thus implementing determination of multi-core interconnect's access accuracy to the L2 cache without delay.

28 Claims, 3 Drawing Sheets

(51) Int. Cl.
  *G06F 12/0811* (2016.01)
  *G06F 13/40* (2006.01)
(52) U.S. Cl.
  CPC ...... *G06F 11/0772* (2013.01); *G06F 12/0811* (2013.01); *G06F 13/4027* (2013.01)

(56) References Cited

U.S. PATENT DOCUMENTS

| | | |
|---|---|---|
| 2011/0238926 A1 | 9/2011 | Fryman et al. |
| 2012/0151251 A1 | 6/2012 | Donley |
| 2014/0281190 A1 | 9/2014 | Kaushikkar |
| 2015/0067259 A1 | 3/2015 | Wang et al. |
| 2015/0095661 A1 | 4/2015 | Sell et al. |
| 2015/0242322 A1* | 8/2015 | Vajapeyam ......... G06F 12/0842 711/119 |
| 2016/0034398 A1* | 2/2016 | Wendel ............... G06F 12/1458 711/129 |
| 2017/0004004 A1 | 1/2017 | Guthrie et al. |
| 2018/0137053 A1 | 5/2018 | Kryukov et al. |
| 2020/0004692 A1* | 1/2020 | Fan .................. G06F 9/544 |
| 2022/0164287 A1* | 5/2022 | Chachad ............ G06F 12/0831 |

FOREIGN PATENT DOCUMENTS

| | | |
|---|---|---|
| CN | 101446987 A | 6/2009 |
| CN | 102103568 A | 6/2011 |
| CN | 102662885 A | 9/2012 |
| CN | 103440223 A | 12/2013 |
| CN | 105740164 A | 7/2016 |
| CN | 109062613 A | 12/2018 |
| WO | WO 2006/090328 A2 | 8/2006 |
| WO | WO 2006/090328 A3 | 8/2006 |
| WO | WO 2019/228506 A1 | 12/2019 |

OTHER PUBLICATIONS

Google Scholar/Patents search—text refined (Year: 2022).*
First Chinese Search Report issued in corresponding Chinese Application No. 201810558363.5 dated Mar. 3, 2020 (2 pages).
European Patent Office Communication issued for Application No. 19810228.7 which encloses the extended European Search Report which includes pursuant to Rule 62 EPC, the Supplementary European Search Report (Art. 153(7) EPC) and the European search opinion, dated Jul. 20, 2021, 17 pages.
PCT International Search Report and Written Opinion dated Aug. 27, 2019, issued in corresponding International Application No. PCT/CN2019/089556 (9 pgs ).
Deorio et al., "Post-Silicon Verification for Cache Coherence," Computer Design, IEEE, 2008, pp. 348-355.

* cited by examiner

| Address N | ● ● ● ● ● ● ● | ● ● ● ● ● ● ● | ● ● ● ● ● ● ● | ● ● ● ● ● ● ● | ● ● ● ● ● ● ● |
|---|---|---|---|---|---|
| Address 3 | Data domain | CPU180 cache line consistency state | CPU181 cache line consistency state | CPU182 cache line consistency state | CPU183 cache line consistency state |
| Address 2 | Data domain | CPU180 cache line consistency state | CPU181 cache line consistency state | CPU182 cache line consistency state | CPU183 cache line consistency state |
| Address 1 | Data domain | CPU180 cache line consistency state | CPU181 cache line consistency state | CPU182 cache line consistency state | CPU183 cache line consistency state |

FIG. 3

METHOD OF VERIFYING ACCESS OF MULTI-CORE INTERCONNECT TO LEVEL-2 CACHE

CROSS REFERENCE TO RELATED APPLICATION

This disclosure is a national stage filing under 35 U.S.C. § 371 of International Application No. PCT/CN2019/089556, filed on May 31, 2019, which claims the benefits of priority to Chinese application number 201810558363.5 filed Jun. 1, 2018, both of which are incorporated herein by reference in their entireties.

BACKGROUND

With an increasing growth of requirements on computing power, high-performance processor design is deeply rooted in the multi-core architecture. A multi-core processor puts forward higher requirements on conventional multi-level high-speed cache structures. The issue of how to maintain data consistency between each single core's caches efficiently and precisely is a difficult research topic. A multi-core interconnect architecture can transmit various types of memory access transmissions sent by all cores to another single core or a next cache according to a cache consistency protocol. An execution result expectation, however, depends on the consistency between a transmission type and a current address attribute. The diversity that is inherent in transmission types and address attributes brings a huge challenge to the field of multi-core verification.

SUMMARY OF THE DISCLOSURE

The present disclosure provides a method and a system of verifying access by a multi-core interconnects to a Level-2 (L2) cache that supports real-time check, wherein the access conforms to a multi-core consistency protocol. The method can comprise detecting transmission sent by single-core processors to a multi-core interconnects system and collecting transmission information on the transmissions or transmitted data; pre-processing the collected transmission information on the transmissions sorting the transmissions or transmitted data that need to access the L2 cache, and storing the transmissions or the transmitted data to a cache expectation queue; observing an access request sent by the multi-core interconnects system to L2 cache and collecting access request information on the access request to the L2 cache, wherein the access request information comprising a request identification number; searching, according to the request identification number, the cache expectation queue to find an expected result corresponding to the access request and reporting errors according to the findings of the expected result; observing and collecting feedback information sent by the L2 cache to the multi-core interconnects system; obtaining statuses of cache lines in all the single-core processors according to the collected feedback information, determining if the L2 cache needs to be accessed again, updating corresponding entry information in the cache expectation queue in response to a determination that L2 cache needs to be accessed again, and deleting the corresponding entry information in the cache expectation queue in response to a determination that L2 cache needs not be accessed again; determining if a primary memory needs to be accessed and storing access on the primary memory to a primary memory expectation queue in response to a determination that the primary memory needs to be accessed; observing a primary memory access request initiated by the multi-core interconnects system to the primary memory and collecting primary memory access request information on the access request to the primary memory; searching the primary memory expectation queue for a valid expected result of the access request, and reporting errors according to the finding of the valid expected result.

BRIEF DESCRIPTION OF THE DRAWINGS

FIG. 3 is a schematic diagram illustrating entry contents of an exemplary global precise control circuitry, according to some embodiments of the present disclosure.

DETAILED DESCRIPTION

To make the objectives, technical solutions and advantages of the embodiments of the present disclosure clearer, the technical solutions in the embodiments of the present disclosure are described below with reference to the accompanying drawings in the embodiments of the present disclosure. Obviously, the described embodiments are merely some rather than all of the embodiments of the present disclosure. Based on the embodiments in the present disclosure, all other embodiments obtained by those with ordinary skill in the art without creative efforts should fall within the protective scope of the present disclosure.

Architects of multi-core interconnects generally add an L2 cache in the multi-core interconnect architecture to improve the performance of the multi-core interconnects. When caches in single cores experience data loss for a certain address, an acquisition of data that used to be directed to an off-chip primary memory can now be transformed to an access to the L2 cache, thus reducing memory access delay. As a result, it becomes important to verify whether accessing the L2 cache is needed, and whether data acquired through accessing the L2 cache is correct. Conventional verification processes are performed based on a single-core access method. If a problem occurs when the multi-core interconnect architecture accesses the L2 cache, it is difficult to locate the problem quickly and precisely. Meanwhile, due to the diversity that is inherent in transmission types sent by the single cores and the different consistency status of current cache lines, it is complicated to determine the result of the access to the L2 cache. Therefore, long delays in locating errors and difficulty in generating a check expectation result are caused in the process of verifying a multi-core interconnection to the L2 cache.

Figure 1:
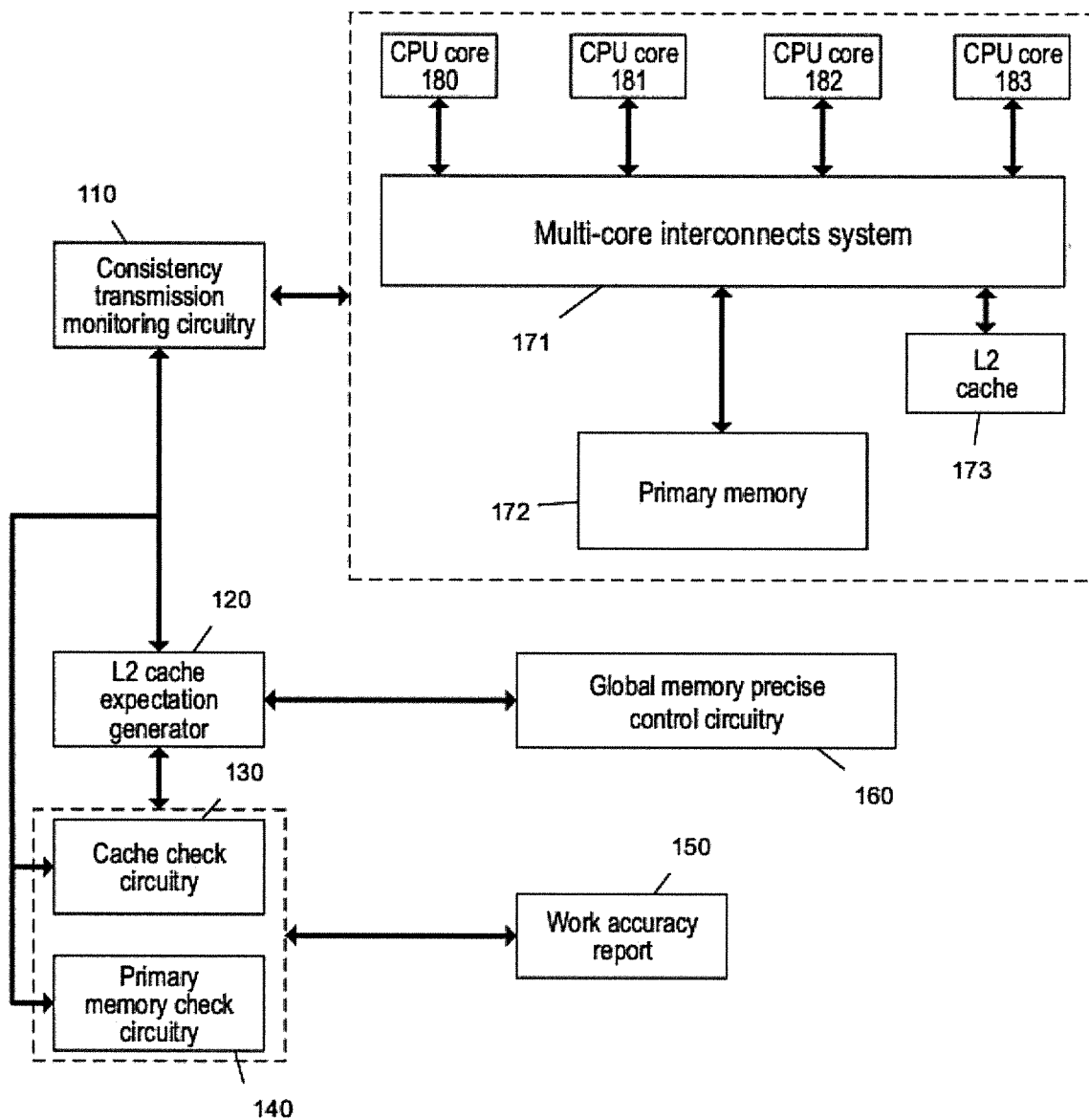
FIG. 1 is a schematic diagram of an exemplary system for verifying access from a multi-core interconnect to an L2 cache, according to some embodiments of the present disclosure.

Embodiments of the present disclosure overcome these issues by providing a system and a method of verifying access from a multi-core interconnect to an L2 cache. FIG. 1 is a schematic diagram of an exemplary system for verifying access from a multi-core interconnect to an L2 cache, according to some embodiments of the present disclosure. The system shown in FIG. 1 comprises a multi-core interconnects system 171, a consistency transmission monitoring circuitry 110, an L2 cache expectation generator 120 and a cache check circuitry 130.

Consistency transmission monitoring circuitry 110 is configured to monitor, in real time, whether any single-core processors in a multi-core system is sending transmitted data. If the transmitted data is sent and detected, consistency transmission monitoring circuitry 110 collects transmission information on the transmitted data. The collecting process is independent from a test stimuli input by a verification platform, and is implemented through consistency transmission monitoring circuitry 110 itself. Consistency transmission monitoring circuitry 110 is further configured to send the transmission information to the L2 cache expectation generator.

L2 cache expectation generator 120 is configured to receive the transmission information from consistency transmission monitoring circuitry 110 and to use the transmission information to sort transmitted data and determine whether the transmitted data needs to access the L2 cache. The sorting process is implemented by analyzing a multi-core consistency operation type and an operation address attribute. L2 cache expectation generator 120 is further configured to store the transmitted data that needs to access the L2 cache to a cache expectation queue. Consistency transmission monitoring circuitry 110 is further configured to observe whether multi-core interconnects system 171 initiates an access request to the L2 cache. If the access request is initiated and observed, access request information associated with the access request is collected, and cache check circuitry 130 is notified to perform a check.

To perform the check, cache check circuitry 130 is configured to search the cache expectation queue to see whether there is an expected result of the request. If there is no valid expected result in the expectation queue, or if there is a valid expected result in the expectation queue but the expected result is inconsistent with an actual result, it is considered that an error has occurred in the system. In some embodiments, the error is then reported and error information is provided. At this point, the result accuracy comparison of a first access initiated to the L2 cache for the request may be completed.

In some embodiments, the system shown in FIG. 1 further comprises a CPU (processor) core 180, a CPU core 181, a CPU core 182, a CPU core 183, an L2 cache 173, and a primary memory 172 that interact with multi-core interconnects system 171. Consistency transmission monitoring circuitry 110 is further configured to monitor whether CPU cores 180-183, L2 cache 173 and primary memory 172 communicate with multi-core interconnects system 171, to collect communication information if there is a communication, and to send the communication information to L2 cache expectation generator 120. L2 cache expectation generator 120 is further configured to generate, by a global memory precise control circuitry 160, an access expectation of multi-core interconnects system 171 for L2 cache 173 and primary memory 172. Cache check circuitry 130 and primary memory check circuitry 140 compare the expected result with an actual result and generate a work accuracy report.

Figure 2:
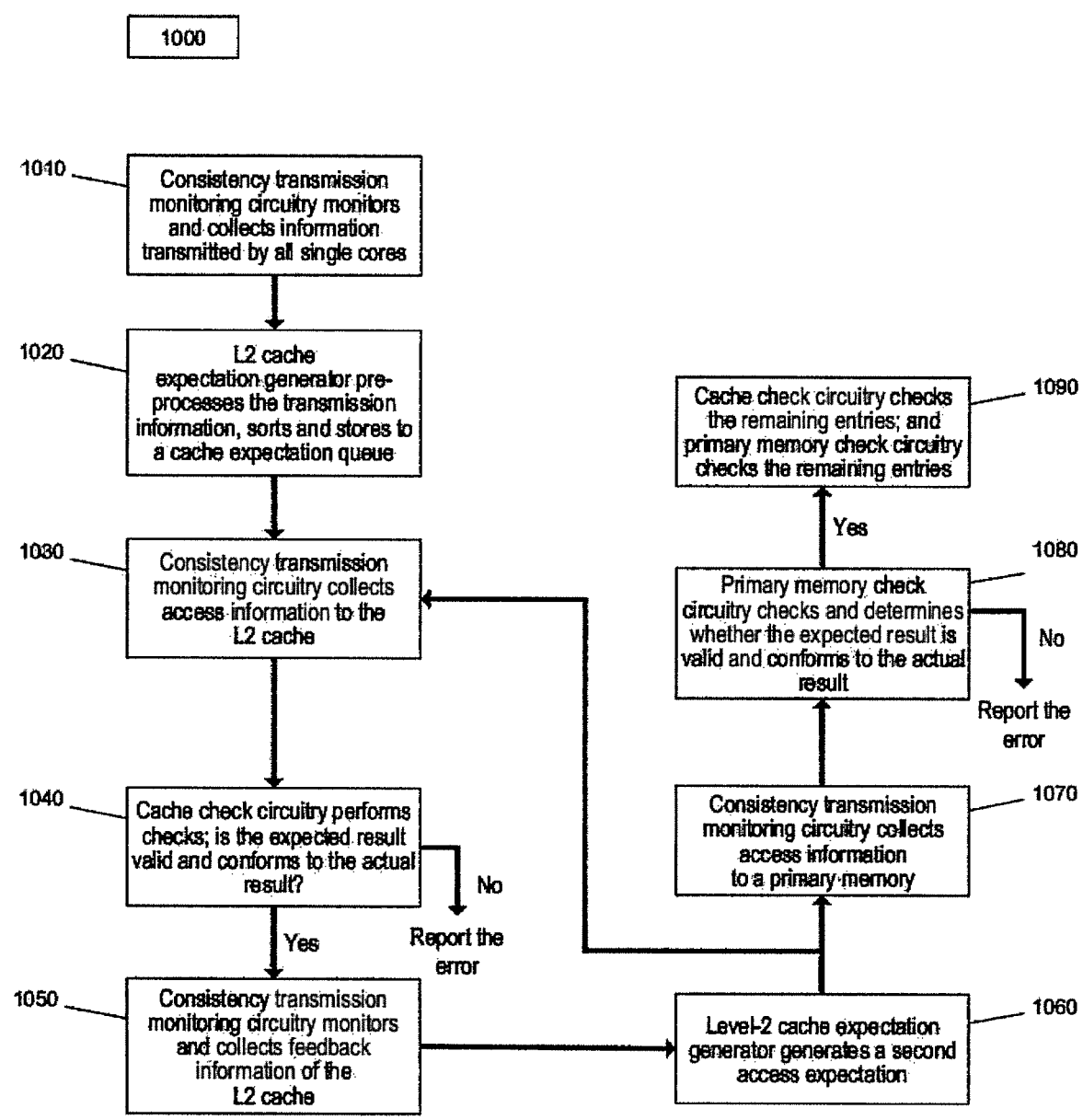
FIG. 2 is a flowchart of an exemplary method of verifying access to an L2 cache without delay, according to some embodiments of the present disclosure.

FIG. 2 is a flowchart of an exemplary method of verifying access to an L2 cache without delay, according to some embodiments of the present disclosure. It is appreciated that the method of FIG. 2 can be performed on the system shown in FIG. 1. As shown in FIG. 2 with reference to FIG. 1, method 1000 includes the following steps.

In step 1010, a consistency transmission monitoring circuitry (e.g., consistency transmission monitoring circuitry 110 of FIG. 1) monitors, in real time, transmitted data sent by single cores to a multi-core interconnects system (e.g., multi-core interconnects system 171 of FIG. 1), collect transmission information on the transmitted data, and sends the collected transmission information to an L2 cache expectation generator (e.g., L2 cache expectation generator 120 of FIG. 1). In some embodiments, the transmission information comprises a multi-core consistency operation type, an operation address, an operation address interval size, an operation data, an operation address attribute, and an operation identification number.

In step 1020, the L2 cache expectation generator pre-processes the received transmission information, sorts the transmitted data to determine whether the transmitted data needs to access the L2 cache, and stores transmission information of the transmitted data that need to access the L2 cache to a cache expectation queue. In some embodiments, the pre-processing comprises screening according to the operation address attribute and accessing the L2 cache in response to finding that the operation address attribute is a cache attribute. In some embodiments, the transmission information of the transmitted data that need to access the L2 cache comprises an operation identification number. The operation identification number is used to identify each transmitted data.

In step 1030, the consistency transmission monitoring circuitry monitors, in real time, an access request sent by the multi-core interconnects system to the L2 cache, collects access request information on the access request, and sends the collected access request information to a cache check circuitry (e.g., cache check circuitry 130 of FIG. 1). In some embodiments, the collected access request information comprises a request identification number for the access request. The request identification number is used to identify each access request. In some embodiments, the collected access request information further comprises an L2 cache operation type, an operation address, an operation data, and an operation identification number.

In step 1040, according to the collected access request information received in step 1030, the cache check circuitry searches the cache expectation queue to see whether there is an expected result of transmission information corresponding to the access request. In some embodiments, the correspondence between the expected result of transmission information and the access request is established when the cache check circuitry can match the request identification number of the access request with an operation identification number in the cache expectation queue, and match other transmission information (e.g., operation type, operation address, etc.) between the access request and the transmitted data identified by the operation identification number. In some embodiments, instead of using the request identification number of the access request to match with the operation identification number in the cache expectation queue, the cache check circuitry can use the operation identification number of the access request.

If there is no valid expected result in the expectation queue, or there is a valid expected result in the expectation queue but the expected result is inconsistent with an actual result, an error is considered to have occurred in the system. In some embodiments, the cache check circuitry reports the error and provides error information. Otherwise, the multi-core interconnects system is determined to be operating correctly and step 1050 is performed.

In step 1050, the consistency transmission monitoring circuitry monitors, in real time, feedback information sent by the L2 cache to the multi-core interconnects system and sends the collected feedback information to the L2 cache expectation generator. In some embodiments, the feedback information comprises an indication indicating whether the cache is missing.

In step 1060, according to the L2 cache feedback information collected in step 1050, the L2 cache expectation generator obtains statuses of cache lines within all the cores from a global memory precise control circuitry (e.g., global memory precise control circuitry 160 of FIG. 1) to determine whether the L2 cache needs to be accessed again. If the L2 cache is to be accessed again, the L2 cache expectation generator updates corresponding entry information in the cache expectation queue. If the L2 cache does not need to be accessed again, the L2 cache expectation generator deletes the corresponding entry information in the cache expectation queue. In addition, the L2 cache expectation generator also determines whether a primary memory (e.g., primary memory 172 of FIG. 1) needs to be accessed. If the primary memory is to be accessed, the L2 cache expectation generator stores transmission information of the transmitted data that needs to access the primary memory to a primary memory expectation queue. In some embodiments, the L2 cache expectation generator converts the access to the L2 cache into an access to the primary memory based on a bus transmission protocol according to the statuses of the cache lines. In some embodiments, the transmission information of the transmitted data that needs to access the primary memory comprises an operation identification number. The operation identification number is used to identify each transmitted data.

In step 1070, the consistency transmission monitoring circuitry monitors and observes, in real time, an access request initiated by the multi-core interconnects system to the primary memory, collecting primary memory access request information on the access request to the primary memory and sends the collected primary memory access request information to a primary memory check circuitry (e.g., primary memory check circuitry 140 of FIG. 1). In some embodiments, the collected primary memory access request information comprises a request identification number of the access request. The request identification number is used to identify each access request. In some embodiments, the primary memory access request information comprises a primary memory access operation type, an operation address, an operation address interval size, an operation data, an operation address attribute, and an operation identification number.

In step 1080 according to the request identification number received in step 1070, the primary memory check circuitry searches the primary memory expectation queue for a valid expected result of the request. In some embodiments, a valid expected result of the request is determined when the primary memory check circuitry can match the request identification number of the access request with an operation identification number in the primary memory expectation queue, and match other transmission information (e.g., operation type, operation address, etc.) between the access request and the transmitted data identified by the operation identification number. In some embodiments, instead of using the request identification number of the access request to match with the operation identification number in the primary memory expectation queue, the primary memory check circuitry can use the operation identification number of the access request.

If there is no valid expected result in the expectation queue, or there is a valid expected result in the expectation queue but the expected result is inconsistent with an actual result, an error is considered to have occurred in the system. In some embodiments, the primary memory check circuitry reports the error and provides error information. Otherwise, the multi-core interconnects system may be determined to be operating correctly and step 1090 is performed.

In step 1090, when all transmitted data finishes with transmitting, the cache check circuitry checks whether there is still one or more remaining entries in the cache expectation queue. The primary memory check circuitry also checks whether there is still one or more remaining entries in the primary memory expectation queue. If there is still one or more remaining entries in the cache expectation queue or the primary memory expectation queue, an error is considered to have occurred in the system. In some embodiments, the cache check circuitry or the primary memory check circuitry reports the error and provides error information. Otherwise, the multi-core interconnects system may be determined to be operating correctly. In some embodiments, the cache check circuitry or the primary memory check circuitry reports an error immediately when finding an error of transmission loss in the multi-core interconnects system.

As shown in step 1050 of FIG. 2, the consistency transmission monitoring circuitry monitors feedback information sent by the L2 cache to the multi-core interconnects system. In some embodiments, the feedback information includes an indication of whether the cache is missing. The L2 cache expectation generator obtains statuses of cache lines within all the cores from the global memory precise control circuitry according to the feedback information, and determines according to the cache consistency protocol whether it is needed to access the L2 cache again. If the access is needed, corresponding entry information in the cache expectation queue is updated. If the access is not needed, the corresponding entry information in the cache expectation queue is deleted. At the same time, it is determined whether it is necessary to access the primary memory. If yes, it is stored to a primary memory expectation queue. Then, the consistency transmission monitoring circuitry observes whether the multi-core interconnects system initiates access to the L2 cache again, and if access is initiated, access information is collected, and the cache check circuitry is notified to perform check. The cache check circuitry searches the cache expectation queue to see whether there is an expected result of the second access request. If there is no valid expected result in the expectation queue, or there is a valid expected result in the expectation queue but the expected result is inconsistent with an actual result, it is considered that an error occurs in the system. In some embodiments, the error is then reported, and error information is provided. The result accuracy comparison of a second access initiated to the L2 cache for the same request may have been completed.

As shown in step 1070 of FIG. 2, the consistency transmission monitoring circuitry observes in real time whether the multi-core interconnects system has initiated access transmission comprising transmitted data to the primary memory. If the transmitted data has been sent, transmission information is collected. The primary memory check circuitry searches, according to a transmission information identification number, the primary memory expectation queue for a valid expected result of the request. If there is no valid expected result in the expectation queue, or there is a valid expected result in the expectation queue but the expected result is inconsistent with an actual result, it is considered that an error occurs in the system. In some embodiments, the primary memory check module then reports the error and provides error information. The result accuracy comparison of access initiated to the primary memory for the same request may be completed.

As shown in step 1090 of FIG. 2, when all transmitted data finishes with transmitting, the cache check circuitry checks whether there is still a remaining entry in the cache expectation queue, and the primary memory check circuitry checks whether there is still a remaining entry in the primary memory expectation queue. If there is still a remaining entry in the cache expectation queue or the primary memory expectation queue, it is considered that an error has occurred in the system. In some embodiments, the cache check circuitry or the primary memory check circuitry reports the error and provides error information. Otherwise, it is determined that the multi-core interconnects system is operating correctly.

FIG. 3 is a schematic diagram illustrating entry contents of an exemplary global precise control circuitry, according to some embodiments of the present disclosure. As shown in FIG. 3, the global precise control circuitry (e.g., global precise control circuitry 160 of FIG. 1) records addresses of write operations from all single cores corresponding to memory addresses, data from some or all single cores, and statuses of cache lines in the single cores. Information records of the same address only have one entry in the global precise control circuitry. Moreover, multiple addresses are stored in a queue, thus reducing occupation of the storage space.

In the method of verifying access by a multi-core interconnect to an L2 cache according to the present disclosure, during operation of a multi-core interconnects system, interaction information, can be collected independent from test stimuli generations, and a global memory precise control circuitry is maintained separately according to the cache consistency principle. An expected result of L2 cache access is then provided without delay, and the determination of multiple cache access is supported. The expected result is finally compared with an actual result to help locate an error quickly.

Some specific embodiments of the present disclosure are described above, and the protective scope of the present disclosure is not limited to these embodiments. Any variation or substitution that can be easily conceived of by those skilled in the art within the technical scope disclosed by the present disclosure should fall within the protective scope of the present disclosure. Therefore, the protective scope of the present disclosure should be subject to the protective scope of the claims.

The invention claimed is:

1. A method of access authentication to a Level-2 (L2) cache, comprising:
   collecting transmission information associated with transmitted data sent by a single-core processor to a multi-core interconnects system, wherein the collected transmission information comprises a multi-core consistency operation type, an operation address, an operation address interval size, an operation data, an operation address attribute, and an operation identification number;
   determining, using the collected transmission information, whether the transmitted data is requesting access to the L2 cache;
   storing, in a cache expectation queue, the determined transmitted data that is requesting access to the L2 cache;
   collecting access request information associated with an access request sent by the multi-core interconnects system to the L2 cache; and
   searching, according to the collected access request information, the cache expectation queue to find an expected transmitted data corresponding to the access request.

2. The method according to claim 1, wherein determining, using the collected transmission information, which detected transmitted data are requesting access to the L2 cache further comprises:
   screening according to the operation address attribute and access the L2 cache in response to a finding that the operation address attribute is a cache attribute.

3. The method according to claim 1, wherein the access request information comprises a request identification number.

4. The method according to claim 1, wherein the access request information further comprises an L2 cache operation type, an operation address, an operation data, and an operation identification number.

5. The method according to claim 1, wherein searching, according to collected access request information, the cache expectation queue to find an expected result corresponding to the access request further comprises:
   finding an error in response to a finding that there is no valid expected result in the cache expectation queue or there is a valid expected result but the expected result is inconsistent with an actual result; and
   reporting the error.

6. The method according to claim 1, further comprising:
   collecting feedback information sent by the L2 cache to the multi-core interconnects system;
   obtaining statuses of cache lines in the single-core processors according to the collected feedback information;
   determining whether the L2 cache is to be accessed again; and
   updating corresponding entry information in the cache expectation queue in response to a determination that the L2 cache is to be accessed again; or
   deleting the corresponding entry information in the cache expectation queue in response to a determination that the L2 cache is not to be accessed again.

7. The method according to claim 6, wherein the feedback information comprises an indication indicating whether the cache is missing.

8. The method according to claim 6, wherein obtaining statuses of cache lines in the single-core processors according to the collected feedback information further comprises:
   recording write operation addresses of the single core processors corresponding to memory addresses and data of the single-core processors for memory addresses.

9. The method according to claim 6, further comprising:
   determining whether a primary memory is to be accessed;
   storing the access on the primary memory to a primary memory expectation queue in response to the determination that the primary memory is to be accessed;
   collecting primary memory access requesting formation associated with an observed primary memory access request sent by the multi-core interconnects system to the primary memory; and
   searching according to the collected primary memory access request information, the primary memory expectation queue to find a valid expected result corresponding to the primary memory access request.

10. The method according to claim 9, wherein searching the primary memory expectation queue for a valid expected result of the primary memory access request further comprises:

finding an error in response to a finding that there is no valid expected result in the primary memory expectation queue or there is a valid expected result but the expected result is inconsistent with an actual result; and reporting the error.

11. The method according to claim 9, wherein determining whether the primary memory is to be accessed and storing access on the primary memory to the primary memory expectation queue in response to the determination that the primary memory is to be accessed further comprises:
converting the access to the L2 cache into an access to the primary memory based on a bus transmission protocol according to the statuses of the cache lines of the memory addresses in the single-core processors.

12. The method according to claim 9, wherein the primary memory access information comprises a primary memory access operation type, an operation address, an operation address interval size, an operation data, an operation address attribute, and an operation identification number.

13. The method according to claim 6, further comprising:
finding any remaining entries in the cache expectation queue in response to all transmitted data finished with transmitting.

14. The method according to claim 13, wherein finding any remaining entries in the cache expectation queue in response to all transmitted data finished with transmitting further comprises:
finding an error based on transmission loss in the multi-core interconnects system; and
reporting the error.

15. A system to verify access from a multi-core interconnect to an L2 cache, comprising:
a consistency transmission monitoring circuitry configured to collect transmission information associated with transmitted data sent by a single-core processor to a multi-core interconnects system, wherein the collected transmission information comprises a multi-core consistency operation type, an operation address, an operation address interval size, an operation data, an operation address attribute, and an operation identification number;
an L2 cache expectation generator configured to:
determine, using the collected transmission information, whether the transmitted data is requesting access to the L2 cache;
store, in a cache expectation queue, the determined transmitted data that is requesting access to the L2 cache; and
collect access request information associated with an access request sent by the multi-core interconnects system to the L2 cache; and
a cache check circuitry configured to search, according to the collected access request information, the cache expectation queue to find an expected transmitted data corresponding to the access request.

16. The system according to claim 15, wherein the L2 expectation generator is further configured to:
screen according to the operation address attribute and access the L2 cache in response to a finding that the operation address attribute is a cache attribute.

17. The system according to claim 15, wherein the access request information comprises a request identification number.

18. The system according to claim 15, wherein the access request information further comprises an L2 cache operation type, an operation address, an operation data, and an operation identification number.

19. The system according to claim 15, wherein the cache check circuitry is further configured to:
find an error in response to a finding that there is no valid expected result in the cache expectation queue or there is a valid expected result but the expected result is inconsistent with an actual result; and
report the error.

20. The system according to claim 15, wherein:
the consistency transmission monitoring circuitry is further configured to:
collect feedback information sent by the L2 cache to the multi-core interconnects system; and
the L2 cache expectation generator is further configured to:
obtain statuses of cache lines in the single-core processors according to the collected feedback information;
determine whether the L2 cache is to be accessed again; and
update corresponding entry information in the cache expectation queue in response to a determination that the L2 cache is to be accessed again; or
delete the corresponding entry information in the cache expectation queue in response to a determination that the L2 cache is not to be accessed again.

21. The system according to claim 20, wherein the feedback information comprises an indication indicating whether the cache is missing.

22. The system according to claim 20, wherein the L2 cache expectation generator is further configured to:
record write operation addresses of the single core processors corresponding to memory addresses and data of the single-core processors for memory addresses.

23. The system according to claim 20, wherein:
the L2 cache expectation generator is further configured to:
determine whether a primary memory is to be accessed; and
store the access on the primary memory to a primary memory expectation queue in response to the determination that the primary memory is to be accessed; and
the consistency transmission monitoring circuitry is further configured to:
collect primary memory access request information associated with an observed primary memory access request sent by the multi-core interconnects system to the primary memory; and
search according to the collected primary memory access request information, the primary memory expectation queue to find a valid expected result corresponding to the primary memory access request.

24. The system according to claim 23, wherein the consistency transmission monitoring circuitry is further configured to:
find an error in response to a finding that there is no valid expected result in the primary memory expectation queue or there is a valid expected result but the expected result is inconsistent with an actual result; and
report the error.

25. The system according to claim 23, wherein the L2 cache expectation generator is further configured to:
convert the access to the L2 cache into an access to the primary memory based on a bus transmission protocol according to the statuses of the cache lines of the memory addresses in the single-core processors.

26. The system according to claim 23, wherein the primary memory access information comprises a primary memory access operation type, an operation address, an operation address interval size, an operation data, an operation address attribute, and an operation identification number.

27. The system according to claim 20, wherein the cache check circuitry is further configured to:
   find any remaining entries in the cache expectation queue in response to all transmitted data finished with transmitting.

28. The system according to claim 27, wherein the cache check circuitry is further configured to:
   find an error based on transmission loss in the multi-core interconnects system; and
   report the error.

\* \* \* \* \*